(12) United States Patent
Bauch

(10) Patent No.: US 12,084,529 B2
(45) Date of Patent: Sep. 10, 2024

(54) METHODS OF STABILIZING HYDROGENATION CATALYSTS

(71) Applicant: ExxonMobil Chemical Patents Inc., Baytown, TX (US)

(72) Inventor: Christopher G. Bauch, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 771 days.

(21) Appl. No.: 17/282,275

(22) PCT Filed: Sep. 25, 2019

(86) PCT No.: PCT/US2019/052823
§ 371 (c)(1),
(2) Date: Apr. 1, 2021

(87) PCT Pub. No.: WO2020/081202
PCT Pub. Date: Apr. 23, 2020

(65) Prior Publication Data
US 2021/0388132 A1    Dec. 16, 2021

Related U.S. Application Data

(60) Provisional application No. 62/746,163, filed on Oct. 16, 2018.

(30) Foreign Application Priority Data
Nov. 13, 2018  (EP) .................................. 18205816

(51) Int. Cl.
*C08F 210/16*   (2006.01)
*C08F 4/642*    (2006.01)
(Continued)

(52) U.S. Cl.
CPC ............ *C08F 210/16* (2013.01); *C08F 4/642* (2013.01); *C08F 4/65922* (2013.01)

(58) Field of Classification Search
CPC .............................. C08F 210/16; C08F 10/00
See application file for complete search history.

(56) References Cited

U.S. PATENT DOCUMENTS

| 4,851,488 A | 7/1989 | Burstain |
| 5,378,778 A | 1/1995 | Debras et al. |

(Continued)

FOREIGN PATENT DOCUMENTS

| EP | 0613873 A2 | 9/1994 | |
| EP | 2898950 A1 * | 7/2015 | .......... B01J 31/0204 |

(Continued)

*Primary Examiner* — Catherine S Branch
(74) *Attorney, Agent, or Firm* — Vorys, Sater, Seymour and Pease LLP

(57) ABSTRACT

Provided is a hydrogenation catalyst solution comprising a solid catalyst precursor and an activator mixed in a solvent solution where propylene or another alpha-olefin or combination thereof is then added to this solution to prevent the formation of solids and stabilize the solution. The hydrogenation catalyst solution can then be combined with a polymerization catalyst such as Ziegler-Natta catalyst in a polymerization reactor so as to remove excess hydrogen from the reactor during a polymerization process. Hydrogen is eliminated by converting a portion of the olefins (propylene and ethylene) present into alkanes (propane and ethane).

16 Claims, 2 Drawing Sheets

(51) Int. Cl.
  *C08F 4/6592* (2006.01)
  *C08F 10/00* (2006.01)

(56) References Cited

U.S. PATENT DOCUMENTS

| | | |
|---|---|---|
| 5,739,220 A | 4/1998 | Shamshoum et al. |
| 6,156,854 A | 12/2000 | Shamshoum et al. |
| 6,221,982 B1 | 4/2001 | Debras et al. |
| 7,897,705 B2 | 3/2011 | Aso et al. |
| 8,410,329 B2 | 4/2013 | Hottovy et al. |
| 9,403,921 B2 | 8/2016 | Bhandarkar et al. |
| 10,544,237 B2 | 1/2020 | Bauch et al. |
| 2005/0288178 A1 | 12/2005 | Jensen et al. |
| 2010/0036068 A1 | 2/2010 | Aso et al. |
| 2013/0296506 A1 | 11/2013 | Lawson et al. |
| 2015/0298112 A1 * | 10/2015 | Araki ............. B01J 31/2282 502/108 |
| 2018/0044453 A1 | 2/2018 | Jiang et al. |
| 2018/0237555 A1 | 8/2018 | Bauch et al. |

FOREIGN PATENT DOCUMENTS

| | | | |
|---|---|---|---|
| WO | WO-2017034722 A1 * | 3/2017 | ............ C08F 110/06 |
| WO | WO 2018/038796 A1 | 3/2018 | |

\* cited by examiner

METHODS OF STABILIZING HYDROGENATION CATALYSTS

CROSS-REFERENCE TO RELATED APPLICATIONS

This application is a National Phase application claiming priority to PCT application Serial No. PCT/US2019/052823, filed Sep. 25, 2019, which claims priority to and the benefit of U.S. Provisional Application No. 62/746,163, filed Oct. 16, 2018, and European Patent Application No. 18205816.4 which was filed Nov. 13, 2018, the disclosures of which are incorporated herein by reference.

FIELD OF THE INVENTION PRIORITY

The present disclosure generally relates to hydrogenation catalysts useful in regulating hydrogen levels in polymerization reactors, and more specifically to methods of preventing the formation of solids in hydrogenation catalyst solutions containing the hydrogenation catalysts.

BACKGROUND OF THE INVENTION

Reactor-produced impact copolymers ("ICP"), in situ blends of propylene homopolymer and propylene/ethylene copolymer ("EP"), are used in applications such as automotive components and domestic appliances. To make the impact copolymers, staged processes are often employed.

In the staged process, propylene homopolymer is first produced (in a first stage) and then subsequently transferred to another reactor (in a second stage) to produce propylene/ethylene copolymer. The same catalyst is often used to make both homopolymer and the copolymer. Hydrogen is added to the first stage (the homopolymer process) in order to control the melt flow rate ("MFR"). In transferring homopolymer to the propylene/ethylene reactor, however, residual hydrogen is also transferred.

In the copolymerization reactor, hydrogen serves as a chain termination agent to generate propylene/ethylene copolymer. The addition of hydrogen increases the MFR (lowering the molecular weight) of the copolymer. This can be undesirable because often a low MFR, or high molecular weight copolymer, is needed for many applications.

Therefore, hydrogen is often removed from the homopolymer in a controlled manner prior to entering the copolymer stage/reactor and/or within the copolymer stage/reactor. Mechanical means for removing the hydrogen prior to entering the copolymer stage/reactor are available, such as a low-pressure separation system. But this approach can be costly to build and operate. Alternatively, hydrogenation catalysts can effectively remove hydrogen from the copolymer stage/reactor.

Notwithstanding the benefits of using a hydrogenation catalyst, certain hydrogenation catalysts that are not activated, such as a titanocene hydrogenation catalyst, are insoluble in hydrocarbon streams until they are reduced by an activator. Furthermore, an inactive hydrogenation catalyst and its activator require sufficient residence time to react and form sufficient quantities of activated hydrogenation catalyst. For these reasons, it is often desirable to combine an inactive hydrogenation catalyst with an activator before injection into the copolymer stage/reactor. However, the activated hydrogenation catalyst solution can form undesirable solids over time when stored in ambient conditions, and solids have the potential to adversely affect process equipment and reduce the hydrogenation activity.

A need exists, therefore, for a method of stabilizing an activated hydrogenation catalyst solution to prevent the formation of solids in the solution for hydrogenation catalyst.

Relevant publications include U.S. Pat. Nos. 4,851,488; 5,739,220; 6,156,854; 6,221,982; 7,897,705; 8,410,329; 9,403,921; US 2005/288178; US 2010/036068; US 2013/0296506; EP 0 288 226 A1; US 2018/0237555; WO 2017/034722; and WO 2018/038796.

SUMMARY OF THE INVENTION

A method of preventing formation of solids in a hydrogenation catalyst comprising (or consists of, or consist essentially of) the steps of: mixing a solid catalyst precursor in a solvent, and optionally with an activator, to form a solvent solution; and combining a C3 to C12 α-olefin with the solvent solution to form a hydrogenation catalyst solution, and optionally followed by contacting at least a portion of the hydrogenation catalyst solution with a first polymerization medium containing hydrogen ($H_2$) to produce a second polymerization medium, wherein the second polymerization medium comprises less hydrogen than the first polymerization medium. The hydrogenation catalyst solution is useful in the production of polymers. In any embodiment, the hydrogenation catalyst solution is substantially free of solids, preferably, by visual observation for at least 90 days, meaning that no turbidity is detected by visual inspection. Preferably, "substantially free of solids" means that when measuring the turbidity of the hydrogenation catalyst solution using a turbidimeter, which measures the intensity of light scattered at 90 degrees as a beam of light passes through a water sample, the turbidity is less than 5 NTU, and most preferably less than 4, or 3, or 2 or 1 NTU. In any embodiment, the solvent is a C3 to C10 alkane.

In any embodiment the solvent solution is stored under pressures above that of atmospheric pressure. In any embodiment, the pressure is at least 20, or 30, or 40 psig (pressure above atmospheric pressure); or within a range from 20, or 30, or 40 psig to 120, or 140, or 160, or 200, or 300 psig. In any embodiment, pressure is maintained using inert gas such as nitrogen, or olefin monomer, or a mixture thereof, preferably an olefin monomer; and preferably if a olefin monomer is used it is one that will preferably be used for the polymerization process, most preferably propylene.

Further provided herein are methods of preventing formation of solids in a hydrogenation catalyst comprising (or consists of, or consist essentially of) the steps of: mixing a solid catalyst precursor in a solvent, and optionally with an activator, to form a solvent solution; and combining a C3 to C12 α-olefin with the solvent solution to form a hydrogenation catalyst solution. The hydrogenation catalyst solution is useful in the production of polymers. The hydrogenation catalyst solution remains substantially free of solids by visual observation for at least 90 days. In any embodiment, the hydrogenation catalyst solution is substantially clear and not substantially turbid by visual inspection. In any embodiment, the solid catalyst precursor is a titanocene. In any embodiment, the titanocene is titanocene dichloride. In any embodiment, the activator is present and comprises an alkylaluminum. In any embodiment, the alkylaluminum is triethylaluminum. In any embodiment, the solid catalyst precursor and the activator form a hydrogenation catalyst. In any embodiment, the hydrogenation catalyst solution is added to a reactor in the presence of a polymerization catalyst.

Further provided are methods method of producing a stabilize hydrogenation catalyst solution comprising the steps: mixing a solid catalyst precursor under pressure in one or more solvents selected from the group consisting of alkanes, cycloalkanes, aromatics, and mixtures thereof, and optionally with an activator, to form a solvent solution; and combining a C3 to C12 α-olefin with the solvent solution to form a hydrogenation catalyst solution.

Also provided are methods of producing a hydrogenation catalyst solution comprising (or consists of, or consist essentially of) the steps: mixing titanocene dichloride with triethylaluminum in an alkane to form catalyst solution; adding propylene under pressure; and combining the pressurized catalyst solution with a Ziegler-Natta catalyst to provide the hydrogenation catalyst solution useful in the production of polymers. In any embodiment, the polymerization catalyst is a Ziegler-Natta catalyst or metallocene catalyst. In any embodiment, the hydrogenation catalyst solution. In any embodiment, the hydrogenation catalyst solution is stored at least 99 days without formation of visible solids. In any embodiment, the hydrogen catalyst solution is maintained under pressure of at least 20 psig to prevent formation of solids. In any embodiment, the α-olefin is propylene.

Moreover, methods of regulating hydrogen in a polymerization reactor are provided. These methods comprise (or consist of, or consist essentially of) the steps of: mixing a solid catalyst precursor in a solvent and optionally an activator to provide a solvent solution; and adding an α-olefin to the solvent solution to form a hydrogenation catalyst solution; providing a first reactor and a second reactor fluidly connected and arranged in series; contacting α-olefin monomers, hydrogen and a polymerization catalyst in the first reactor to form a first feed comprising the hydrogen, the catalyst, and polyolefin; contacting the first feed with the hydrogenation catalyst solution to form a second feed; and contacting the second feed with α-olefin monomers in the second reactor to form a polyolefin impact copolymer.

In these methods, the amount of hydrogen in the first feed is greater than that in the second feed. In any embodiment, the α-olefin monomers comprise propylene, the first reactor comprises a slurry loop reactor, and the second reactor comprises a gas phase reactor. In any embodiment, the first feed is contacted with the hydrogenation catalyst solution in a feed line connected to the polymerization reactor. In any embodiment, the first feed is contacted with is the hydrogenation catalyst solution in a recycle line connected to the polymerization reactor. In any embodiment, the solid catalyst precursor within the range from 500, or 600, or 800, or 1000 mol $H_2$/mole titanium/minute to 4,000, or 5,000, or 10,000 mol $H_2$/mole titanium/minute. In any embodiment, the first feed further comprises propylene homopolymer. In any embodiment, the α-olefin monomers are ethylene and propylene, and the polymerization catalyst is contacted with the propylene homopolymer and α-olefin monomers to form a poly(propylene-co-propylene/ethylene) impact copolymer comprising a propylene/ethylene copolymer. In any embodiment, the melt flow rate (ASTM D1238 230° C./2.16 kg) of the propylene/ethylene copolymer is within a range from 0.0050 g/10 min to 100 g/10 min. In any embodiment, the second reactor is a gas phase reactor comprising an expansion zone, a fluidized bed zone, and a feed line fluidly connected to the gas phase reactor, wherein contacting the first feed with the hydrogenation catalyst solution takes place the feed line. In any embodiment, a low-pressure separation system is absent from the first feed, the second feed, the first reactor, and the second reactor.

DETAILED DESCRIPTION

Figure 1:
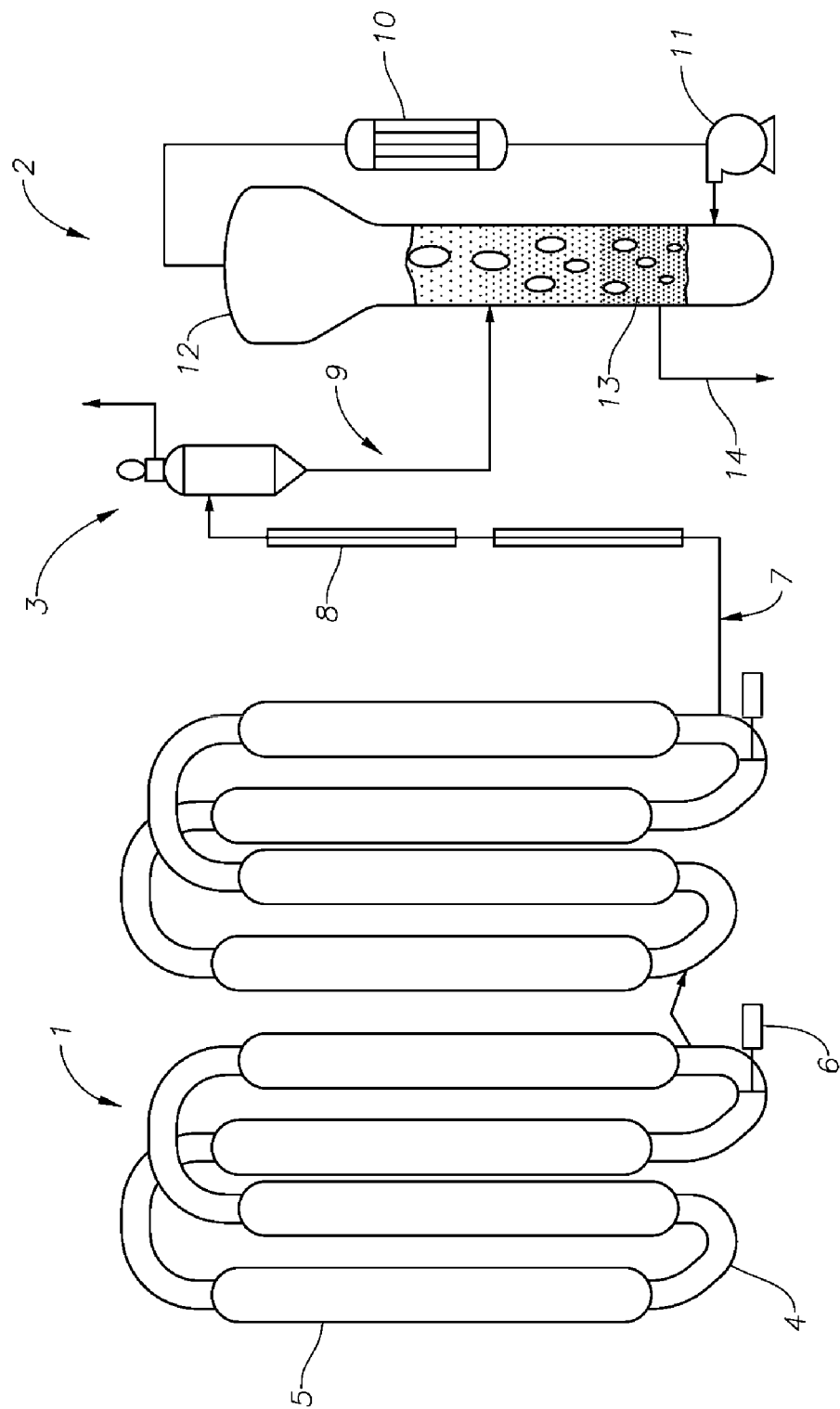
FIG. 1 is a schematic diagram of a two-stage reactor system for producing ICP.

The present invention is directed to methods to stabilize solutions of hydrogenation catalysts used in polyolefin polymerization processes. The formation of solids within an activated hydrogenation catalyst solution can adversely affect process equipment and reduce hydrogenation activity. Typically, a hydrogenation catalyst such as an activated titanocene hydrogenation catalyst forms a solution that is clear when first activated but becomes turbid and purple over time as solids form. The present invention solves this and other problems.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

As used herein, a "solvent" is any hydrocarbon compound that is a liquid at 23° C. and between 0.1 and 10 atmospheres, preferably between 0.5 and 2 atmospheres, that is preferably capable of solubilizing organometallic catalyst compounds such as a titanocene described herein. The solvent can preferably be selected from the group consisting of alkanes, cycloalkanes, aromatics, and mixtures thereof.

The term "alkane" refers to an acyclic branched or unbranched hydrocarbon having the general formula $C_nH_{2n+2}$; preferably the alkane used as the solvent is a C3 to C10 alkane, which can be linear or branched.

The term "cycloalkane" refers to saturated monocyclic hydrocarbons with or without side chains, and is preferably a C4 to C12 cycloalkane.

The term "aromatic" refers to compounds having conjugated carbon-carbon double bonds such as benzene, cyclopentadiene, toluene, and xylene.

The term "alpha-olefin," or "α-olefin," refers to an olefin having a terminal carbon-to-carbon double bond in the structure thereof $(R^1R^2)$—C=$CH_2$, where $R^1$ and $R^2$ can be independently hydrogen or any hydrocarbyl group. In any embodiment, $R^1$ is hydrogen, and $R^2$ is an alkyl group. A "linear alpha-olefin" is an alpha-olefin as defined in this paragraph wherein $R^1$ is hydrogen, and $R^2$ is hydrogen or a linear alkyl group. Preferred alpha-olefins include ethylene, propylene, butene, hexene, and octene, and most preferably, propylene.

A "polymerization medium" is a composition that includes at least one polymer or copolymer and may optionally include a solvent, monomers, or a combination of solvent and monomers.

A "catalyst system" as used herein may include one or more polymerization catalysts, activators, supports/carriers, or any combination thereof, and the terms "catalyst" and "catalyst system" are intended to be used interchangeably herein. The term "supported" as used herein refers to one or more compounds that are deposited on, contacted with, vaporized with, bonded to, or incorporated within, adsorbed or absorbed in, or on, a support or carrier. The terms "support" or "carrier" for purposes of this specification are used interchangeably and are any support material, or a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

As used herein, the term "copolymer" means polymers having more than one type of monomer, including interpolymers, terpolymers, or higher order polymers.

The term "density" as used herein, and unless otherwise specified, refers to the density of the polymer independent of any additives, such as antiblocks, which may change the tested value. As used herein, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and said derived units are present at 35 wt % to 55 wt %, based upon the weight of the copolymer. A copolymer can be terpolymers and the like.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81.sup.st ed. 2000).

The term "metallocene catalyst" refers to an organometallic compound with at least one π-bound cyclopentadienyl (Cp) moiety (or substituted cyclopentadienyl moiety such as indenyl or fluorenyl), and more frequently two π-bound cyclopentadienyl moieties or substituted cyclopentadienyl moieties. This includes other π-bound moieties such as indenyls or fluorenyls or derivatives thereof. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "melt index" ("MI") is the number of grams extruded in 10 minutes under the action of a standard load and is an inverse measure of viscosity. A high melt index implies low viscosity and low melt index means high viscosity. In addition, polymers are shear thinning, which means that their resistance to flow decreases as the shear rate increases. This is due to molecular alignments in the direction of flow and disentanglements.

As provided herein, melt index is determined according to ASTM D-1238-E (190° C./2.16 kg), also sometimes referred to as $I_2$ or $I_{2.16}$.

The melt index ratio ("MIR") is the ratio of $I_{21}/I_2$ and provides an indication of the amount of shear thinning behavior of the polymer and a parameter that might be correlated to the overall polymer mixture molecular weight distribution data obtained separately by using Gas Permeation Chromatography ("GPC") and possibly in combination with another polymer analysis including TREF.

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

As used herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

"Melt flow rate" (MFR) is measured by using ASTM D-1238 at 230° C. and 2.16 kg load and is expressed in grams per 10 minutes.

The term "regulating" means that the level of hydrogen reaching the polymerization reactor is such that its concentration is increased or decreased in a manner dictated by a person or control device (e.g., computer).

Most any type of olefin polymerization catalyst is useful in the invention described herein. As used herein, a "polymerization catalyst" is a compound capable of catalyzing the polymerization of olefins to polyolefins, especially propylene and ethylene to polypropylenes and/or polyethylenes. Common polymerization catalysts include Ziegler-Natta catalysts, metallocenes, and other single-site catalysts.

As used herein, a "Ziegler-Natta" catalyst is defined as a transition metal compound bearing a metal-carbon bond—excluding cyclopentadienyls or ligands isolobal to cyclopentadienyl—and able to carry out a repeated insertion of olefin units. Definitions and examples of Ziegler-Natta catalyst used for propylene polymers can be found in Chapter 2 of "Polypropylene Handbook" by Nello Pasquini, $2^{nd}$ Edition, Carl Hansen Verlag, Munich 2005. Examples of Ziegler-Natta catalysts include first and second generation $TiCl_2$ based, the $MgCl_2$ supported catalysts as described in the "Polypropylene Handbook" by N. Pasquini. The polypropylenes useful herein may be made using Ziegler-Natta catalysts.

As used herein, the term "metallocene catalyst" refers to a catalyst having at least one transition metal compound containing one or more substituted or unsubstituted cyclopentadienyl moiety ("Cp") (typically two Cp moieties) in combination with a Group 4, 5, or 6 transition metal (M). A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (such as methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica.

As used herein, "single-site catalyst" means a Group 4 through 10 transition metal compound that is not a metallocene catalyst and capable of initiating olefin catalysis, such as Diimine-ligated Ni and Pd complexes; Pyridinediimine-ligated Fe complexes; Pyridylamine-ligated Hf complexes (e.g., U.S. Ser. No. 14/195,634, filed Mar. 3, 2014, U.S. 61/815,065, filed Apr. 23, 2013); Bis(phenoxy-imine)-ligated Ti, Zr, and Hf complexes. Other examples of single-site catalysts are described in G. H. Hlatky "Heterogeneous Single-Site Catalysts for Olefin Polymerization," 100 CHEM. REV., 1347-1376, (2000), and K. Press, A. Cohen, I. Goldberg, V. Venditto, M. Mazzeo, M. Kol, "Salalen Titanium Complexes in the Highly Isospecific Polymerization of 1-Hexene and Propylene," in 50 ANGEW. CHEM. INT. ED., 3529-3532, (2011), and references therein. Examples of single-site catalysts include complexes containing tert-butyl-substituted phenolates ($[Lig_{1-3}TiBn_2]$), complex $[Lig_4TiBn_2]$ featuring the bulky adamantyl group, the sterically unhindered complex $[Lig_5TiBn_2]$. The polypropylenes and α-olefin copolymers may be produced in any embodiment using such catalysts.

Disclosed herein are methods of preventing the formation of solids in a hydrogenation catalyst solution. In any embodiment, the methods are also useful in reversing the formation of solids in a hydrogenation catalyst solution. Hydrogenation catalyst solutions are typically clear blue when first produced, but over time can turn purple and turbid as solids form. Therefore, the present methods are also useful in converting a purple or turbid color solution back to clear blue.

As described herein, generally a hydrogenation catalyst can be made using a solid catalyst precursor and optionally an activator mixed in a solvent solution. Preferably, the activator is present. In any embodiment, the solvent solution is a C3 to C10 alkane, most preferably hexane. As provided herein, propylene or another alpha-olefin or combination thereof, are then added to the hydrogenation catalyst to form a hydrogenation catalyst solution. The hydrogenation catalyst solution can then be combined with a polymerization catalyst in a polymerization reactor so as to remove excess hydrogen from the reactor during a polymerization process. In any embodiment, the solid catalyst precursor comprises a titanocene. More specifically, in any embodiment, the titanocene is titanocene dichloride. In any embodiment, the activator comprises an alkylaluminum. More specifically, In any embodiment, the alkylaluminum is triethylaluminum.

As described in detail below, once produced, the hydrogenation catalyst solution can then be added into the polymerization reactor process stream. In any embodiment, the hydrogenation catalyst solution is added after the production of polypropylene homopolymer but before the second stage of the process or the propylene/ethylene copolymer reactor. The solid catalyst precursor in conjunction with the activator acts as a catalyst for hydrogenation of propylene and ethylene, removing hydrogen from the reaction system by converting propylene to propane and ethylene to ethane. This allows for the production of high viscosity EP in the gas phase without the need of a mechanical hydrogen removal system. The activator may be added with the solid catalyst precursor, separately from the solid catalyst precursor, or the activator already within the polymerization reactor may be utilized.

The present hydrogenation catalyst solutions comprise an activator. In any embodiment, the activator is an alkylaluminum or blend of alkylaluminum compounds. In any embodiment, the activator is an alkylaluminum having the general formula $AlR_3$, where R is a C1 to C10 alkyl, In any embodiment a C1 to C5 alkyl. In any embodiment, the activator is triethylaluminum.

In any embodiment, the solid catalyst precursor is a titanocene. In any embodiment, the solid catalyst precursor is selected from $C_2$ and Cs-symmetric titanocene cations comprising any two ligands selected from cyclopentadienyl ligands and ligands isolobal to cyclopentadienyl, and anions selected from halogen, alkyl, and alkoxy groups. In any embodiment, the solid catalyst precursor is a $C_2$ symmetric titanocene, such as a bis-cyclopentadienyl titanium dihalide or dialkyl, or bis-indenyl titanium dihalide or dialkyl. In any embodiment, the solid catalyst precursor is titanocene dichloride.

The solid catalyst precursor and activator can be combined simultaneously or separately in time and space. In any embodiment, the solid catalyst precursor and activator are combined such that they react with hydrogen prior to entering the polymerization reactor.

Solid catalyst precursor in the range of 0.0001 mmole to 0.01 mmole can be contacted with the hydrogen. In any embodiment, the rate of solid catalyst precursor fed to the reactor is within a range from 500 or 600 or 800 or 1,000 mole $H_2$/mole solid catalyst precursor/min to 3,000 or 4,000 or 5,000 mole $H_2$/mole solid catalyst precursor/min. These amounts of components can be independently increased or decreased to regulate the amount of hydrogen in the feed line, and in particular, hydrogen entering the polymerization reactor. Thus, for example, the amount of solid catalyst precursor can be increased alone, or can be increased with an increase in the activator. This can also be reversed to allow more hydrogen to stay in the feed line and enter the polymerization reactor.

In any embodiment, to prepare the hydrogenation catalyst solution, the solvent solution, preferably a C3 to C10 alkane solution, comprising titanocene dichloride and triethylaluminum complex (CB4) is prepared and then propylene or another alpha-olefin added. Then, in the presence of Ziegler Natta polymerization catalysts, the hydrogenation catalyst solution will remove hydrogen by converting a portion of the olefins (propylene and ethylene) present into alkanes (propane and ethane). In order to prevent the formation of the solids, propylene (or another alpha-olefin) is added to the solution to stabilize the hydrogenation catalyst. Hence, the hydrogenation catalyst solution is useful in regulating and/or reducing hydrogen in a polymerization reactor. The hydrogenation catalyst solution is not only stable but potentially a more potent regulator of hydrogen because of the absent of solids.

As such, methods of regulating and/or reducing hydrogen in a polymerization reactor comprise the steps of: (a) providing a first reactor and a second reactor fluidly connected and arranged in series; (b) contacting α-olefin monomers and a polymerization catalyst in the first reactor to form a first polyolefin; (c) contacting a first feed comprising hydrogen, the polymerization catalyst, and the first polyolefin with the present hydrogenation catalyst solution to form a second feed; and (d) contacting the second feed with α-olefin monomers and the same or different polymerization catalyst in the second reactor to form a polyolefin impact copolymer. The amount of hydrogen in the first feed is typically greater than that in the second feed. The "first" and "second" reactors can be any type of reactors, independently, such as a slurry reactor comprising any number of "loops," a gas phase reactor comprising any number of fluidized beds and expansion zones, a solution reactor, and combinations thereof.

In the present methods, the regulation of hydrogen fed to a polymerization reactor can be achieved by contacting a hydrogenation catalyst with hydrogen prior to entering the second reactor. As described herein, the first reactor can be operated in series with the second reactor (also referred to as the "polymerization" reactor). Thus, the second feed can include polymer produced in the first reactor.

Therefore, methods of regulating hydrogen in a polymerization reactor comprise the steps of: (a) contacting a first feed comprising hydrogen with a hydrogenation catalyst solution prior to entering a polymerization reactor to form a second feed; and (b) in the polymerization reactor, contacting the second feed with a polymerization catalyst and α-olefin monomers to form a polyolefin. The amount of hydrogenation catalyst solution in the first feed can be increased to lower the level of hydrogen in the second feed, and decreased to raise the level of hydrogen in the second feed, thus regulating the level of hydrogen.

For example, a "first feed" can comprise polymerization discharge from a first stage of a two-stage process or first reactor. In addition to hydrogen, the first feed can also include polymer, especially polypropylene, and its entrained catalyst. The "second feed" can be a feed of polymer, its entrained catalyst, and the hydrogenation catalyst solution transported to a subsequent polymerization stage/reactor. The first feed and second feed can be in the feed line from one reactor to another reactor, a monomer feed line to one of the reactors, or in a recycle line to and from the same reactor.

As used herein, "regulating" refers to the level of hydrogen reaching the polymerization reactor such that the concentration is increased or decreased in a manner dictated by a person or control device (e.g., computer). Regulating can be affected by adjusting the amount of hydrogenation catalyst solution introduced into the feed such that the hydrogen concentration in the subsequent stage/reactor is increased or decreased in a manner dictated by a person or control device (e.g., computer).

In any embodiment, methods of reducing hydrogen in a polymerization reactor comprise the steps of: (a) contacting a first feed comprising hydrogen with a hydrogenation catalyst solution prior to entering a polymerization reactor to form a second feed, and (b) contacting the second feed with monomers and a polymerization catalyst in a polymerization reactor to form a polymer, wherein the amount of hydrogen in the first feed is greater than the amount of hydrogen in the second feed.

In any embodiment, methods of reducing hydrogen in a polymerization reactor comprise the steps of: (a) contacting the feed comprising hydrogen with the hydrogenation catalyst solution prior to entering a polymerization reactor; and (b) contacting the feed with monomers in a polymerization reactor to form a polymer, wherein the amount of hydrogen in the polymerization reactor is reduced by the hydrogenation catalyst solution.

As described herein, the first feed can be contacted with the hydrogenation catalyst in a feed line connected to the polymerization reactor. The "hydrogenation catalyst" can be any chemical composition that reacts with hydrogen in such a way to either transform it to another substance (e.g., combine with an alkene to form alkanes) or sequester it such that it is no longer capable of chemically reacting with any other substance. Metals, supported or not, such as palladium and/or platinum can be suitable hydrogenation catalysts. Some hydrogenation catalysts require an "activator" such as an alkylaluminum compound or blend of such compounds. In any embodiment, the hydrogenation catalyst comprises a titanocene catalyst precursor (or referred to herein as a "titanocene") as used in combination with an alkylaluminum. The titanocene catalyst precursor can be selected from $C_2$ and Cs-symmetric titanocene cations comprising any two ligands selected from cyclopentadienyl ligands and ligands isolobal to cyclopentadienyl, and anions selected from halogen, alkyl, and alkoxy groups. The titanocene catalyst precursor can be $C_2$ symmetric, such as a bis-cyclopentadienyl titanium dihalide or dialkyl, or bis-indenyl titanium dihalide or dialkyl.

The titanocene and alkylaluminum can be combined simultaneously or separately in time and space. The titanocene and alkylaluminum are combined such that they react with hydrogen prior to entering the polymerization reactor. Suitable alkylaluminum include those having the general formula $AlR_3$, where R is a C1 to C10 alkyl, for example, a C1 to C5 alkyl.

Between 0.0001 mmole to 0.01 mmole of the titanocene can be contacted with the hydrogen. In addition, the molar ratio of alkylaluminum to titanocene can be within a range from 1 to 5. Stated another way, the rate of titanocene fed to the reactor is within a range from 500 or 600 or 800 or 1,000 mole $H_2$/mole titanium/min to 3,000 or 4,000 or 5,000 mole $H_2$/mole titanium/min, the rate that is contacted with the feed containing hydrogen to be consumed. These amounts of components can be independently increased or decreased in order to regulate the amount of hydrogen in the feed line, and in particular, hydrogen entering the polymerization reactor. Thus, for example, the amount of titanocene can be increased alone, or can be increased with an increase in the alkylaluminum. This can be reversed to allow more hydrogen to stay in the feed line and enter the polymerization reactor.

There can be any amount of hydrogen in the feed line, depending upon the nature of the process from which the feed derives. The feed can be derived from a propylene homopolymerization process where hydrogen is used to regulate the melt flow rate (or molecular weight) of the so formed polypropylene. The first feed can comprise within the range from 50 or 80 or 100 or 140 or 180 mmol $H_2$ to 200 or 240 or 280 or 300 or 350 or 400 mmol $H_2$. Also, the second feed (or subsequent stage/reactor hydrogen concentration) comprises within the range from 0.50 or 1.0 or 2.0 or 5.0 or 10.0 mmol $H_2$ to 20 or 25 or 30 or 35 or 40 mmol $H_2$.

Stated another way, for example, in a commercial scale reactor, the level of hydrogen used in propylene homopolymerization is within a range from 100 or 200 or 500 mppm to 8,000 or 10,000 or 12,000 or 15,000 mppm (mole parts per million, or ppm on a molar basis) relative to the total amount of monomer, which can be liquid propylene; and the level of hydrogen used in copolymer production is within a range from 100 or 200 or 400 mppm to 1,000 or 5,000 or 10,000 or 25,000 or 50,000 mppm relative to the total amount of monomer, which can be gaseous monomer and hydrogen in the reactor, such as a gas phase reactor; and after contacting the feed from the propylene polymerization reactors, the concentration of hydrogen going to the copolymerization reactor, such as a gas phase reactor, is within a range from 0 or 10 or 20 or 50 or 100 mppm to 200 or 300 or 400 or 500 or 1,000 or 4,000 or 8,000 or 10,000 mppm relative to total monomer in the reactor.

In any embodiment, the first feed comprises within the range from 100 mppm to 15,000 mppm (or any range described herein) relative to liquid propylene, and the second feed comprises within the range from 0 mppm to 10,000 mppm (or any range described herein) relative to total monomer in the reactor, wherein the total amount, or flow rate, of hydrogen in the second feed is less than that of the first feed.

The processes described herein are suitable for use in any type of polymerization reactor that requires the regulation and/or removal of hydrogen from one stage to another. For example, the process is applicable to a polyolefin polymerization process, and particularly, to a process to make a poly(propylene-co-propylene/ethylene) impact copolymer.

In this regard, a non-limiting example of such a process is described with reference to FIG. 1, which depicts at least one a slurry reactor (which may comprise any number of loops) and at least one gas phase reactor (which may comprise any number of fluidized beds) fluidly connected and arranged in series, meaning that fluids and gases are allowed to flow from one reactor to another to carry polymer, monomer, catalyst and/or other gases such as hydrogen in such a manner that polymerization can occur in, for example, the slurry reactor then can continue in, for example, the gas phase reactor.

As described herein, the process may be carried out in a two-stage process, whereby at least one reactor is used to make a propylene homopolymer and another reactor is used to make the EP. Referring to FIG. 1, propylene homopolymer is produced in reactor 1, which can be a slurry loop reactor, and the EP is produced in another reactor 2, which can be a gas phase reactor or a fluidized bed gas phase reactor. As suggested in FIG. 1, propylene is contacted with a polyolefin polymerization catalyst in a slurry loop reactor 1. There may be any number of loops 4, each can have a heat removal jacket 5, whereby the monomers in either a liquid (pure propylene) or solution (propylene with a diluent) are cycled through the loops using at least one pump 6 along with polymerization catalyst and hydrogen. The propylene homopolymer that is produced from reactor 1 is then feed through the effluent line 7, that can have heated jackets 8, to a high-pressure separator 3, whereby the pressure from the reactor 1 is lowered to recover a large portion of the unreacted monomer and hydrogen and to allow the transfer of the homopolymer and catalyst and a portion of the unreacted monomer and hydrogen to the reactor 2 which may be at a lower pressure. In any case, the propylene homopolymer containing polymerization catalyst and hydrogen is then passed through feed line 9 that leads to the reactor 2. Prior to delivering the feed from reactor 1 to reactor 2, the hydrogenation catalyst is contacted with the feed in either one or both of line 7 and line 9.

After contacting the hydrogenation catalyst with the hydrogen in either one or both of lines 7 and 9, the second feed passes to reactor 2 via feed line 9. The level of hydrogenation catalyst can be regulated by altering the concentration of the hydrogenation catalyst (and or its co-catalyst such as the alkylaluminum), especially if it is in solution, and/or the rate at which it is added to either or both lines. The amount can be regulated to tailor the level of hydrogen desired, thus allowing for control over the melt flow rate (i.e., molecular weight) of the EP to be formed in reactor 2. The propylene homopolymer, along with entrained polymerization catalyst, can be added along with ethylene monomers to the fluidized bed zone 13 of the gas phase reactor having an expansion zone 12 where the forming ICP is returned to the fluidized bed zone and monomer is recycled through recycle lines that incorporate a cooler 10 then to compressor 11 then are flowed back through reactor 2. The point along the reactor 2 in which the feed from feed line 9 enters the reactor is not critical, and depending on the type of reactor that is used to make the EP, the feed line 9 may enter anywhere that is suitable.

A low-pressure separation system can be absent from the feed lines 7 and/or 9, and/or polymerization reactor 2. A low-pressure separation system cannot used to remove hydrogen, or regulate hydrogen, from any step of the polymerization process.

The polymerization catalyst such as a metallocene or Ziegler-Natta polymerization catalyst can be contacted with the propylene homopolymer and ethylene to form a poly(propylene-co-propylene/ethylene) impact copolymer comprising a propylene/ethylene copolymer. The polymerization catalyst can be imbedded into the propylene homopolymer particles which are porous enough to allow further polymerization with ethylene and/or propylene monomers to form a copolymer within the homopolymer matrix.

The hydrogenation catalyst, titanocene with or without alkylaluminum, can be injected into the gas recirculation system, or recycle line, of the polymerization reactor or the gas phase polymerization reactor.

In any case, regulation of the amount of catalyst can be achieved either via an intermittent flow using volumetric measurement or continuous flow using a pump. This can be upstream or downstream of heat exchange equipment in the process, or upstream or downstream of gas compression or blower equipment in the process stream, or in the solids transfer line into the gas phase reactor from upstream equipment; in any case, upstream of the gas-phase reactor. The turbulence of this high-flow gas system allows for adequate mixing of the hydrogenation catalyst into the gas stream prior to introduction into the gas phase reactor itself, and a brief residence time to initiate the hydrogenation reaction prior to reaching the polymer bed in the reactor itself. This provides for control of a hydrogenation reaction whether the material is introduced as a mixture with its activator (in the case of titanocene) or as a slurry, either utilizing the residual alkylaluminum in the polymerization process to act as the titanocene reducing agent or adding the alkylaluminum in the slurry transfer system.

Desirably, control of the propylene or ethylene hydrogenation reaction using hydrogenation catalysts in a polymerization reactor incorporates any one or more of three aspects: (1) full dispersion of the material into the reaction medium, (2) residence time to provide for completion of the reaction, and (3) flow control of a very small, yet specific quantity of hydrogenation catalyst to achieve the necessary molar ratio of hydrogenation catalyst to hydrogen in the system. As described above, the catalyst is delivered as a liquid solution in which hydrogenation catalyst is activated with an alkylaluminum (in the case of titanocene) and then diluted in a hydrocarbon solvent, for example n-hexane and a propylene or other alpha-olefin is added to the solution. The addition of propylene to the solution prevents or reverses the formation of solids that have the potential to adversely affect process equipment and reduce the hydrogenation activity.

The first two aspects are achieved by proper selection of injection location into the polymerization reactor system. The injection location can be either upstream or downstream of the gas compressor or its associated heat exchanger in the recycle system (including the recycle line and any coolers, heaters and pumps) of the polymerization reactor, or directly into the monomer feed streams to the reactor, or in the polymer solids feed into the polymerization reactor. Furthermore, the injection location be upstream of any reaction inhibitor added, for example oxygen, alcohols, or other oxygenated compounds, as this allows for initiation of the hydrogenation reaction at the point of lowest concentration of the inhibitor which also limits the effectiveness of the hydrogenation catalyst.

Flow control, the third aspect of control, can be achieved via multiple, batch injections of a specified volume of hydrogenation catalyst using a sequence of valves and control automation. Controlling the reaction can be accomplished by injecting the solution at a frequency that provides for a linear, predictable hydrogenation reaction by using a ratio based on the residence time of the polymerization bed in the gas phase reactor, which varies, depending on the polymer being produced. The range of variation versus the quantity of hydrogenation catalyst required, is beyond what pumps of this size range could typically control well. The timed volumetric method allows for a broad range of operating regions by providing a system where injection timing (average flow rate) and concentration of catalyst solution can both be modified during reactor operation without mechanical adjustments of a pump, or multiple pumps in the same service.

A positive-displacement piston style pump can be selected for its ability to tightly control both stroke and speed at very small increments may be used for flow control. A gear pump may also be used, but further limits the range of flow variation possible.

The hydrogenation catalyst can be delivered to the reactor as an intermittent "shot" of hydrogenation catalyst, in some instances inactivated hydrogenation catalyst such as titanocene alone, in solid form via a rotary solids feeder or other solids metering device. This solid stream is then swept into the targeted location using a hydrocarbon stream, typically a light paraffin or oil, along with the catalyst activator, typically an alkylaluminum (for example triethylaluminum). The liquid stream thus performs the function of activating the hydrogenation catalyst prior to injection into the reaction medium as well as transporting the catalyst to the reaction medium. The hydrogenation may also be injected without the activator, utilizing the alkyl in the gas phase reactor to activate.

Any solid hydrogenation catalyst can be made into a slurry by the hydrocarbon stream to the polymerization reactor prior to the catalyst's dissolving into solution. Some catalysts such as titanocene are not soluble in hydrocarbon streams until it is reduced with the alkylaluminum. As such, the initial velocity at the pickup point of the catalyst must be high. The velocity of this stream is dependent upon the specific particle size of the catalyst employed. This is calculable by methods well-known in the art of suspending solid particles in a flowing liquid. The second aspect requires that the system provides enough residence time for the reduction step of the titanocene with alkylaluminum to occur in time to provide sufficient hydrogen reduction for the control requirement at hand. This is provided for by either (a) designing a delivery line of sufficient length to achieve the necessary residence time as the catalyst is carried to the injection point, or (b) utilizing a vessel downstream of the solid pickup point but upstream of the liquid injection point. The vessel is of sufficient volume to provide the required residence time, and utilizes an agitator instead of fluid velocity to provide the turbulence required to maintain a slurry of solid particles until the reduction occurs and the now-activated catalyst dissolves. From this vessel onward to the liquid injection point, the catalyst is now in a stable solution.

As described herein, stabilization has been performed using PTES (propltriethozysilane) indicating that other electron donors would also have the stabilizing effect of propylene. The electron donors, include but are not limited to, any mono-, di-, tri- and tetrasiloxanes. $R_xSi(OR)_{x-y}$ where y and x=0-4 and y+x=4 are useful in connection with the methods described herein.

As an alternative, a high velocity stream of paraffin, olefin, or oil alone can be used to carry the solid hydrogenation catalyst as a slurry to the reaction injection point and remaining alkylaluminum from the reaction process then acts as the activating agent for the titanocene, starting the hydrogenation reaction upon injection. In a reaction system where sufficient excess alkylaluminum is present and residence time is available to activate the titanocene and drive the hydrogenation reaction to the extent needed, this is due to reduced handling and raw material costs associated with the activator (if needed) and any solvents required in an alternate system as discussed previously.

Any type of polymerization catalyst can be used to form the polyolefin, especially the ICP described above. Useful catalysts include metallocenes and other single site catalyst and their associated activators, and Ziegler-Natta catalyst and its associated activator. In either case, the alkylaluminum described herein may also be used as the activator for the polymerization catalyst. In any embodiment, the alkylaluminum that is used in the polymerization of α-olefins to form polyolefins is also the alkylaluminum that activates the titanocene hydrogenation catalyst, thus, in those cases additional alkylaluminum does not need to be added with the titanocene. In any case, polyolefins that can be produced include polyethylene, polypropylene, and copolymers of ethylene and propylene (propylene/ethylene copolymer). The catalyst can be useful in forming propylene homopolymers as an in situ blend with propylene/ethylene copolymer to form an ICP. In that case, the catalyst should be capable of readily polymerizing propylene and copolymerizing propylene and ethylene while maintaining high catalyst activity.

Figure 2:
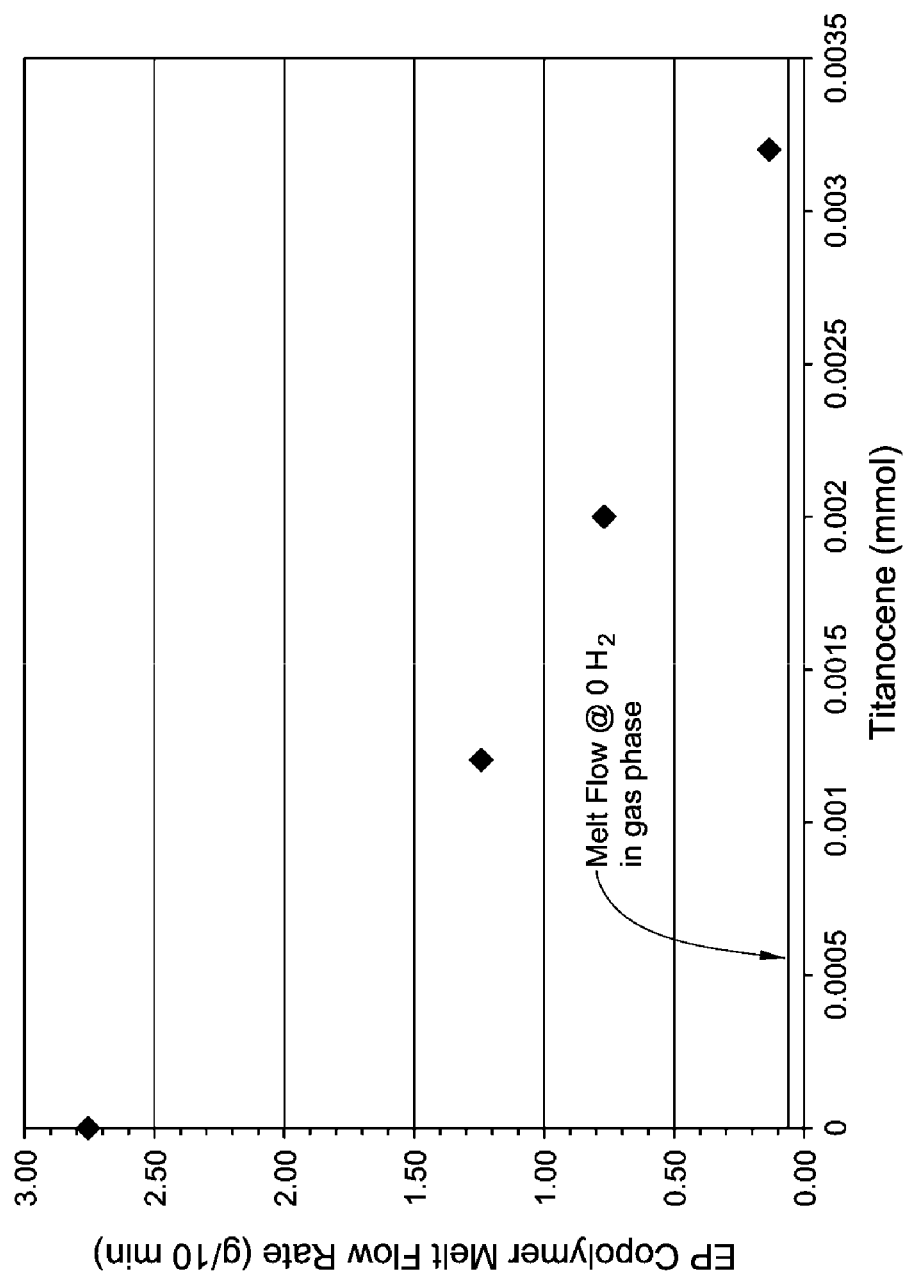
FIG. 2 is a plot of melt flow rate of EP produced as a function of the level of titanocene hydrogenation catalyst added to the feed line.

The melt flow rate (ASTM D1238 230° C./2.16 kg) of the propylene/ethylene copolymer can be within a range from 0.0050 or 0.05 or 0.5 or 1 g/10 min to 4 or 5 or 10 or 20 or 50 or 100 g/10 min. The melt flow rate (ASTM D1238 230° C./2.16 kg) of the poly(propylene-co-propylene/ethylene) impact copolymer is within a range from 20 or 25 g/10 min to 35 or 40 or 45 or 50 or 55 or 60 or 70 or 80 or 100 or 200 or 400 or 500 g/10 min. Thus, for instance, when the level of hydrogenation catalyst is such that there is no detectable hydrogen in the feed line entering the reactor, the melt flow rate of the EP may be as low as 0.0050 g/10 min, but can be increased with increasing hydrogen reaching the polymerization reactor, such as demonstrated in FIG. 2.

When a poly(propylene-co-propylene/ethylene) impact copolymer is the final product, the propylene/ethylene copolymer comprises within a range from 35 or 40 wt % to 55 or 60 wt % ethylene derived monomer units. The poly(propylene-co-propylene/ethylene) impact copolymer comprises within a range from 8 or 10 wt % to 22 or 26 or 30 wt % of the propylene/ethylene copolymer.

Thus, the poly(propylene-co-propylene/ethylene) impact copolymer comprises a propylene homopolymer and within the range from 8 or 10 wt % to 22 or 26 or 30 wt % of a propylene/ethylene copolymer comprising within a range from 35 or 40 wt % to 55 or 60 wt % ethylene derived monomer units, and having a melt flow rate (ASTM D1238 230° C./2.16 kg) within a range from 0.0050 g/10 min to 5.0 g/10 min, wherein the melt flow rate of the poly(propylene-co-propylene/ethylene) impact copolymer is within a range from 20 or 25 g/10 min to 35 or 40 or 45 or 50 or 55 or 60 or 70 or 80 or 100 g/10 min; and wherein the melt flow rate of the propylene homopolymer is within a range from 80 or 100 g/10 min to 220 or 260 or 280 or 300 or 400 or 500 g/10 min.

Such impact copolymers are useful in any number of finished articles such as automotive components, appliance components such as refrigerators, and sporting goods and equipment. The impact copolymers may also be foamed as is known in the art to make any number of useful articles.

The various descriptive elements and numerical ranges disclosed herein for the inventive process can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Activated hydrogenation catalyst solutions were stored in differing conditions to demonstrate the prevention of solid formation according to the invention. Specifically, 27.0 g of titanocene dichloride was weighed out in a dry box. The titanocene dichloride was then transferred to a 1 L round bottom flask with a stir bar. Between 375 mL and 400 mL of hexane was then added to the flask to create a slurry with the titanocene dichloride. Next, 49.5 g of triethylaluminum was weighed into a 250 mL beaker, and subsequently poured into the flask containing titanocene dichloride and hexane. One-third of the triethylaluminum was added to the flask with each pour, with manual swirling of the flask between pours. The red, solid titanocene dichloride turned dark and then dissolved to form a deep blue solution with the evolution of gas. The beaker was rinsed twice with hexane and poured into the flask to capture any remaining triethylaluminum remaining in the beaker. After these hexane rinses, the solution in the flask had a total volume of about 803 mL. The solution was stirred for 10 minutes to completely dissolve the triethylaluminum ("TDC"). The solution was then transferred into a 1 liter ("L") stainless steel cylinder.

Two cylinders, each containing a titanocene dichloride/triethylaluminum/hexane solution formed via the above-described process, were stored under nitrogen at about 8 psig. After the solutions aged for 30 days, one cylinder was stored under propylene at about 100 psig, while the other cylinder remained under nitrogen at 8 psig. After the solutions aged for 99 days, the solution under propylene was still clear blue while the solution under nitrogen had become cloudy purple.

As used herein, "consisting essentially of" means that the claimed process does not include any other steps that alter the fundamental process of forming the hydrogenation catalyst solution and/or polyolefin, but may include other minor steps such as solvent and/or monomer separation, heating and/or cooling, pressurizing and/or depressurizing, etc.

The invention claimed is:

1. A method of preventing formation of solids in a hydrogenation catalyst comprising the steps of:
   (a) mixing a solid hydrogenation catalyst precursor with a solvent, and optionally with an activator, to form a solvent solution; followed by
   (b) combining a C3 to C12 α-olefin with the solvent solution to form a hydrogenation catalyst solution, wherein the C3 to C12 α-olefin excludes 1-octene.

2. The method of claim 1, wherein the hydrogenation catalyst solution is substantially clear by visual inspection.

3. The method of claim 1, wherein the solid hydrogenation catalyst precursor is a titanocene.

4. The method of claim 3, wherein the C3 to C12 α-olefin is combined with the solvent solution at a pressure of at least 20 psig.

5. The method of claim 1, wherein the activator comprises an alkylaluminum.

6. The method of claim 1, followed by contacting at least a portion of the hydrogenation catalyst solution with a first polymerization medium containing hydrogen ($H_2$) to produce a second polymerization medium, wherein the second polymerization medium comprises less hydrogen than the first polymerization medium.

7. The method of claim 1, wherein the hydrogenation catalyst solution is added to a reactor in the presence of a polymerization catalyst.

8. The method of claim 1, wherein the solvent is a C3 to C10 alkane.

9. The method of claim 1, wherein the solvent is hexane.

10. A method of producing a hydrogenation catalyst solution comprising the steps:
    (a) mixing titanocene dichloride with triethylaluminum in a solvent to form a solvent solution;
    (b) adding propylene under pressure of at least 20 psig to the solvent solution; and
    (c) combining the solvent solution with a Ziegler-Natta catalyst to provide the hydrogenation catalyst solution useful in the production of polymers.

11. The method of claim 10, wherein the hydrogenation catalyst solution is stored at least 99 days without formation of visible solids.

12. The method of claim 10, wherein the hydrogenation catalyst solution is maintained under pressure of at least 20 psig to prevent formation of solids.

13. The method of claim 10, wherein the solvent is a C3 to C10 alkane.

14. The method of claim 1, wherein the C3 to C12 α-olefin is combined with the solvent solution after a time sufficient for an activated hydrogenation catalyst to form solids in the solvent solution, and the C3 to C12 α-olefin reverses formation of the solids.

15. The method of claim 1, wherein the hydrogenation catalyst solution is stored at least 99 days without formation of visible solids.

16. The method of claim 1, wherein the solvent solution comprises at least 20 weight percent (wt. %) dissolved activated hydrogenation catalyst.

* * * * *